United States Patent [19]

Pfeiffer

[11] 4,268,743

[45] May 19, 1981

[54] COUNTING-DOWN COUNTER

[75] Inventor: Horst Pfeiffer, Aldingen, Fed. Rep. of Germany

[73] Assignee: J. Hengstler K.G., Aldingen, Fed. Rep. of Germany

[21] Appl. No.: 49,354

[22] Filed: Jun. 18, 1979

[30] Foreign Application Priority Data

Jun. 22, 1978 [DE] Fed. Rep. of Germany ....... 2827315

[51] Int. Cl.[3] ...................... G06F 15/18; G06C 25/00

[52] U.S. Cl. ........................... 235/130 R; 235/132 R

[58] Field of Search .......... 235/130 R, 132 R, 132 A, 235/137, 144 PN, 144 MG, 144 SM, 76, 131 FD, 144 S, 144 DM, 82 R-82 K

[56] References Cited

U.S. PATENT DOCUMENTS 2,808,208 10/1957 Wales ............................ 235/132 R 2,966,301 12/1960 Fowlie .......................... 235/132 R 3,447,744 6/1969 Irion et al. ..................... 235/132 R

FOREIGN PATENT DOCUMENTS 1574738 12/1978 Fed. Rep. of Germany .

*Primary Examiner*—L. T. Hix

*Assistant Examiner*—Benjamin R. Fuller

*Attorney, Agent, or Firm*—Balogh, Osann, Kramer, Dvorak, Genova & Traub

[57] ABSTRACT

At least one presetting digit wheel consists of a rotatably mounted digit-carrying wheel part, a rotatably mounted resetting wheel part, and a non-positive two-way coupling means connecting the digit-carrying wheel part and the resetting wheel part for joint rotation. A rotatably mounted resetting shaft is provided. Lost-motion one-way coupling means are adapted to connect the rotatably mounted resetting shaft and the resetting wheel part for joint rotation only in one sense and only when the resetting shaft and said resetting wheel part are in a predetermined rotational position relative to each other. Detent means are adapted to hold the resetting shaft against rotation in a predetermined rotational position thereof, and locking key means are manually operable to hold the digit-carrying wheel against rotation when the resetting wheel part is rotated by said resetting shaft.

11 Claims, 4 Drawing Figures

COUNTING-DOWN COUNTER

Figure 1:
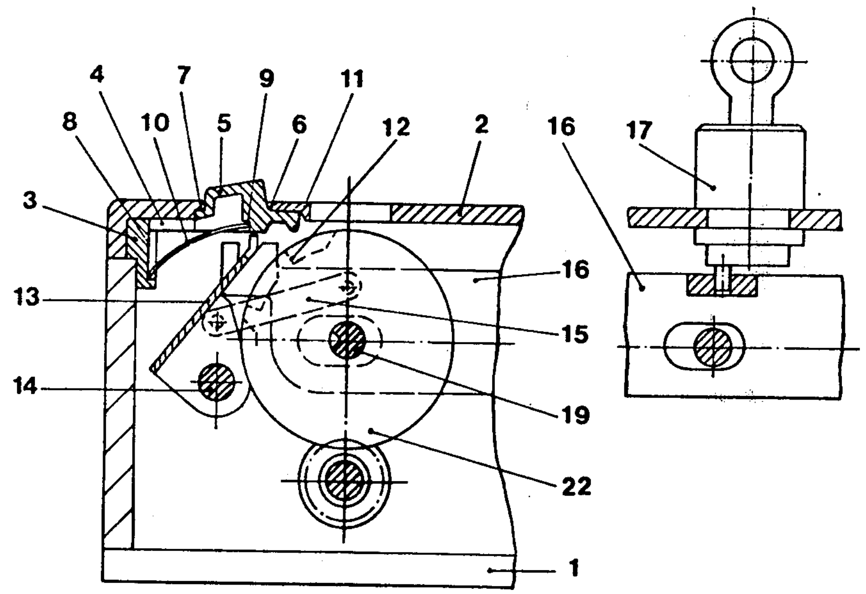

This invention relates to a presetting mechanism for presettable counting-down counters which are rotationally resettable and comprise two-part setting digit wheels.

Rotationally resettable counters comprising means for locking the preset count are known, e.g., from German Patent No. 1,574,738. Said counters comprise two-part presetting wheels, which are connected by ratchet mechanisms and are presettable by means of setting keys. The resetting wheel part of the presetting wheel is provided with the ratchet and by means of the pawl for locking the part in the zero position engaging the groove of the resetting shaft, which is locked or resiliently held in the basic position. That arrangement has the disadvantage that the presetting requires an engagement and this can be ensured only if the wheel part is reset to the originally preset count before a setting operation can be performed. Besides, the key must perform a long stroke for stepping the digit-carrying wheel part relative to the resettable wheel part in steps in the presetting operation. For this reason, expensive bearing and guiding means for the presetting keys are required so that such keys are bulky and expensive, particularly because the presetting keys protrude greatly from the body of the appliance owing to the long stroke which is required. For these reasons, such keys when subjected to rough usage are not practical and are liable to be damaged. The means for sealisng against dust and other environmental influences are also more expensive when long key strokes are required and for this reason can be provided only with greater difficulty.

It is an object of the present invention to provide a presetting mechanism which comprises short-stroke locking keys so that the mechanism can be made at lower cost. Besides, it is an object of the invention to avoid the above-mentioned disadvantages and particularly to provide a presetting mechanism which requires a minimum of space and will be unaffected by rough usage and functionally reliable.

The presetting mechanism for presettable counting-down counters which are rotationally resettable is characterized in that a locking key is associated with the digit-carrying wheel part of each presetting digit wheel and is operable to hold the digit-carrying wheel part in the selected digit position, whereas the resetting wheel part of the wheel is adapted to be rotated by the resetting shaft until the latter has reached a click stop, wherein the locking keys are carried by a profiled bar and capable of performing only a small or short pivotal stroke and are preferably integrally made with that bar from plastic material, and said bar is adapted to be fitted into the housing or cover of the counter.

Whereas in known arrangements the digit-carrying wheel parts are set by means of presetting keys and the resetting wheel part engages the click-stopped resetting shaft, the digit-carrying wheel part in the arrangement according to the invention is locked and presetting is effected in that the resetting wheel part is rotated by means of the resetting shaft. Whereas a plurality of presetting keys were previously required, a single plastic member is now used, which is provided with keys which can perform only a short stroke.

From known arrangements, in which presetting is effected directly by the setting keys, the mechanism according to the invention differs in that presetting is effected by the resetting wheel part of the digit wheel. For the setting operation, the resetting wheel part is rotated by means of the resetting shaft. The digit-carrying wheel part is locked in position by the depressed locking key as soon as the desired digit has appeared in the reading window. As the resetting shaft is turned to the position in which it is click-stopped, the resetting wheel part is rotated by said shaft relative to the digit-carrying wheel part, which is held in position. In this way the wheel is set to the preselected value. This presetting operation can be effected for each digit or can be effected for two or more digits at the same time; in the latter case, a corresponding plurality of digit-carrying wheel parts are to be held in position whereas the associated resetting wheel parts follow the rotation of the resetting shaft until the latter is click-stopped. As a result, the set digit is directly visible as soon as the presetting operation has been completed and the checking of that digit does not require an additional expenditure.

Figure 2:
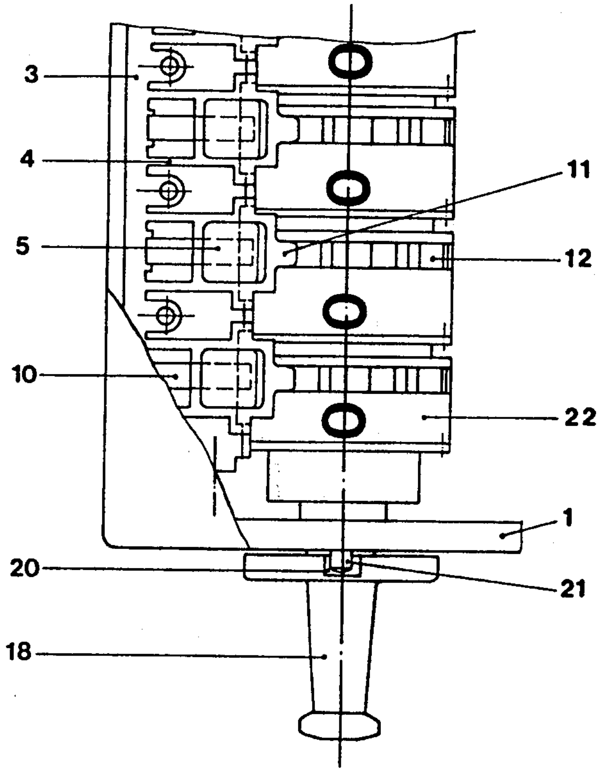
Figure 3:
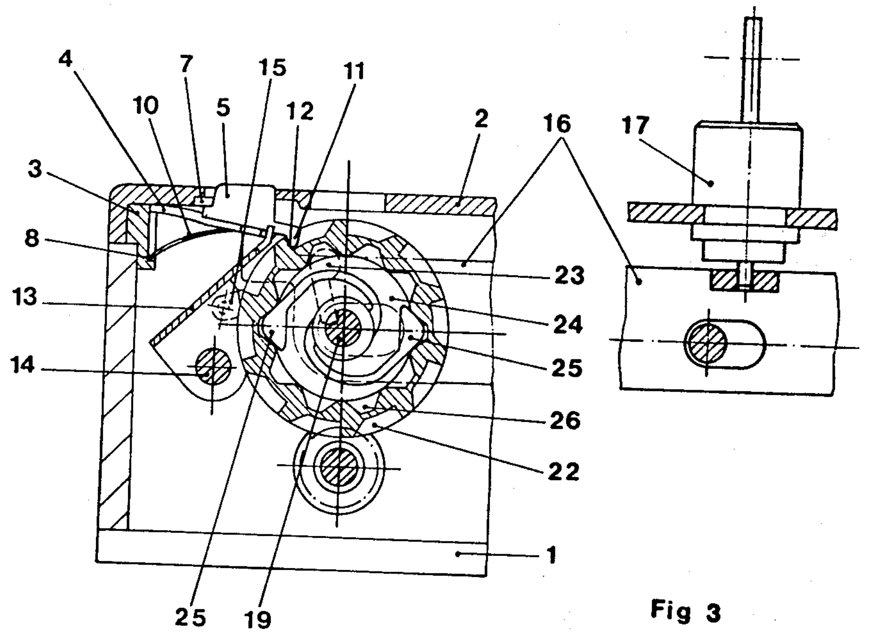
Figure 4:
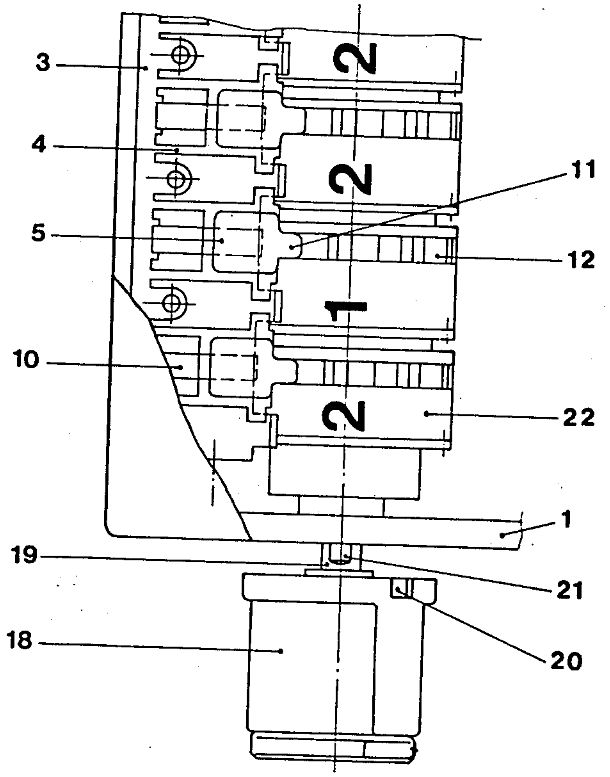

Further details of the invention will become apparent from the following description, in which reference is made to the accompanying diagrammatic drawing, in which FIG. 1 is a sectional showing a presetting mechanism in basic position, FIG. 2 is a top plan view showing the mechanism from the reading side, FIG. 3 is a sectional view showing the mechanism with the ratchet when the locking key has been depressed, and FIG. 4 is a top plan view showing the mechanism viewed from the reading side in the same position as in FIG. 3.

The invention is intended for use in a known counter which is presettable and is rotationally resettable and comprises two-part presetting digit wheels, the parts of which are connected by ratchets and which can be set to preselected values by means of presetting keys. The presetting mechanism according to the invention comprises locking keys, which during the presetting operation serve to hold the digit-carrying part of the digit wheel in position while the resetting part of the wheel is rotated by the resetting shaft as the latter is rotated to the position in which it is click-stopped.

As is apparent from FIG. 1 a profiled bar 3 is provided between a main housing part 1 and a cover 2 of the counter. The bar 3 is injection-molded and integrally formed with locking keys 5 joined to the bar 3 by respective resilient connecting webs 4, which tend to return the keys. Each locking key 5 extends through an opening 6 of the cover 2 so as to permit manual actuation thereof. Each key 5 has a laterally protruding edge portion 7 provided with a labyrinth groove for sealing against an ingress of dust. Each locking key has recesses 8, 9, which accommodate a leaf spring 10, which increases the bias of the key and urges the edge portion 7 tightly against the cover 2. Each locking key 5 is integrally formed with a locking nose 11, which engages the locking teeth 12 of the digit-carrying part 22 of the digit wheel when the locking key 5 is depressed. There is also a blocking member 13, which is pivoted on a pivot 14 and prevents the locking noses 11 from engaging the locking teeth 12 during the counting operation. That blocking member 13 can be rendered operative and inoperative by a member 15, which is connected to a slider 16. A lock 17 is provided, which permits the slider 16 to be operated by a key.

FIG. 2 is a top plan view showing that mechanism. The connecting webs 4 between the profiled bar 3 and the locking keys 5 are seen as well as the leaf spring 10 associated with each locking key 5. The resetting knob 18 and the resetting shaft 19 connected thereto are in their reset position, in which they are click-stopped by a detent notch 20 of the resetting knob 18 and a pin 21, which is fixed in the housing 1 and engages the notch 20. The digit position 000 of the digit-carrying parts 22 of the digit wheels means that they are all set to the digit zero.

In the position shown in FIG. 3, the blocking member 13 has been pivotally moved to its release position by the slider 16, which has been actuated by the lock. The locking key 5 with its locking nose 11 is in locking position. The digit-carrying part 22 of the digit wheel is held in the position corresponding to the preset digit. In the showing of FIG. 4, this is the digit 2. The resetting shaft 19 is then reset by means of the resetting knob 18. By a one-way coupling element 23, shown in FIG. 3, the resetting part 24 of the digit wheel is rotated in unison with the resetting shaft to the position in which the wheel part is resiliently held. By means of the coupling element 23, the resetting wheel part 24 can be rotated by the resetting shaft 19 only in the resetting sense and only when the parts 19 and 24 are in a predetermined rotational position relative to each other. The resetting wheel part 24 is connected to the digit-carrying wheel part 22 by a non-positive two-way coupling, which consists of mutually opposite pawls 25 carried by the resetting wheel part 24 and teeth 26 carried by the digit-carrying wheel part 22. When the resetting wheel part 24 of the digit wheel is rotated while the digit-carrying wheel part 22 is locked by the depressed locking key, the pawls 25 skip the teeth 26. When the resetting knob 18 has been rotated to the position in which the pin 21 enters the detent notch 20, the resetting wheel part 24 is in the position corresponding to the preset digit 2.

When the counter has counted down to zero and delivered a signal, the resetting mechanism can be used to reset the counter to the preset number in known manner by means of the resetting knob 18 and the resetting shaft 19.

What is claimed is:

1. Counting-down counter comprising, in combination at least one presetting digit wheel consisting of a rotatably mounted digit-carrying wheel part, a rotatably mounted resetting wheel part, and non-positive two-way coupling means connecting said digit-carrying wheel part and said resetting wheel part for joint rotation, a rotatably mounted resetting shaft, lost-motion one-way coupling means adapted to connect said resetting shaft and said resetting wheel part for joint rotation only in one sense and only when said resetting shaft and said resetting wheel part are in a predetermined rotational position relative to each other, detent means for holding said resetting shaft against rotation in a predetermined rotational position thereof, and locking key means which are manually operable for performing a short pivotal stroke so as to hold said digit-carrying wheel part against rotation during a presetting operation, while said resetting wheel part is rotated by said resetting shaft, until the latter has reached a click-stop.

2. A counter as set forth in claim 1, in which a plurality of said digit wheels are provided, said lost-motion one-way coupling means are adapted to connect said resetting shaft to the resetting wheel part of each of said digit wheels for joint rotation only in said one sense and only when said resetting shaft and said resetting wheel part are in a predetermined rotational position relative to each other, and said locking key means comprise a plurality of individually operable locking keys associated with respective ones of said digit wheels.

3. A counter as set forth in claim 2, in which said digit wheels are mounted in a housing structure, said locking key means comprise a bar mounted in said housing structure, and said locking keys are carried by said bar and pivotally movable relative thereto through a small angle.

4. A counter as set forth in claim 3, in which said bar is secured to a main housing part forming part of said housing structure.

5. A counter as set forth in claim 3, in which said bar is secured to a cover forming part of said housing structure.

6. A counter as set forth in claim 3, in which said bar consists of plastic and is integrally formed with said locking keys.

7. A counter as set forth in claim 6, in which said locking keys consist of resilient plastic material and have an inherent bias resisting said manual operation thereof, each of said locking keys is formed with two recesses facing in the direction of said manual operation, and a leaf spring engages each of said locking keys at said two recesses thereof and resists said manual operation thereof.

8. A counter as set forth in claim 3 in which said housing structure is formed with a plurality of apertures, each of said locking keys protrudes out of said housing structure through one of said apertures, and each of said locking keys is resiliently biased to engage the inside surface of said housing structure around the respective aperture.

9. A counter as set forth in claim 8, in which each of said locking keys is formed with labyrinth grooves adjoining the inside surface of said housing structure around the respective aperture.

10. A counter as set forth in claim 2, in which each of said digit-carrying wheel parts comprises an annular series of locking teeth and each of said locking keys comprises a locking nose, which is engageable with the locking teeth of the associated digit-carrying wheel part in response to the operation of said locking key.

11. A counter as set forth in claim 2, which comprises a rakelike blocking member adapted to engage said locking keys on the side facing in the direction of their manual operation to block them against such manual operation and key-operable means for moving said blocking member into and out of engagement with said locking keys.

* * * * *